J. THOMSON & J. RAMSEY.

CORN-PLANTER.

No. 6,821.

Reissued Dec. 21, 1875.

Witnesses:
Alex Mahas
John G. Center

G. D. J. T. L. L. & M. Haworth,
Assignees of J. Thomson & J. Ramsey
by A. M. Smith
Attorneys.

N. PETERS, PHOTO-LITHOGRAPHER, WASHINGTON, D. C.

UNITED STATES PATENT OFFICE.

JOHN THOMSON AND JOHN RAMSEY, OF ALEDO, ASSIGNORS, BY MESNE ASSIGNMENTS, TO GEORGE D. HAWORTH, JAMES W. HAWORTH, LYSANDER L. HAWORTH, AND MAHLON HAWORTH, OF DECATUR, ILL.

IMPROVEMENT IN CORN-PLANTERS.

Specification forming part of Letters Patent No. 44,472, dated September 27, 1864; reissue No. 6,821, dated December 21, 1875; application filed November 23, 1875.

*To all whom it may concern:*

Be it known that JOHN THOMSON and JOHN RAMSEY, both of Aledo, in the county of Mercer and State of Illinois, did invent certain new and useful Improvements in Corn-Planters, of which the following is a full, clear, and exact description, reference being had to the accompanying drawing, making part of this specification, in which—

Figure 1:
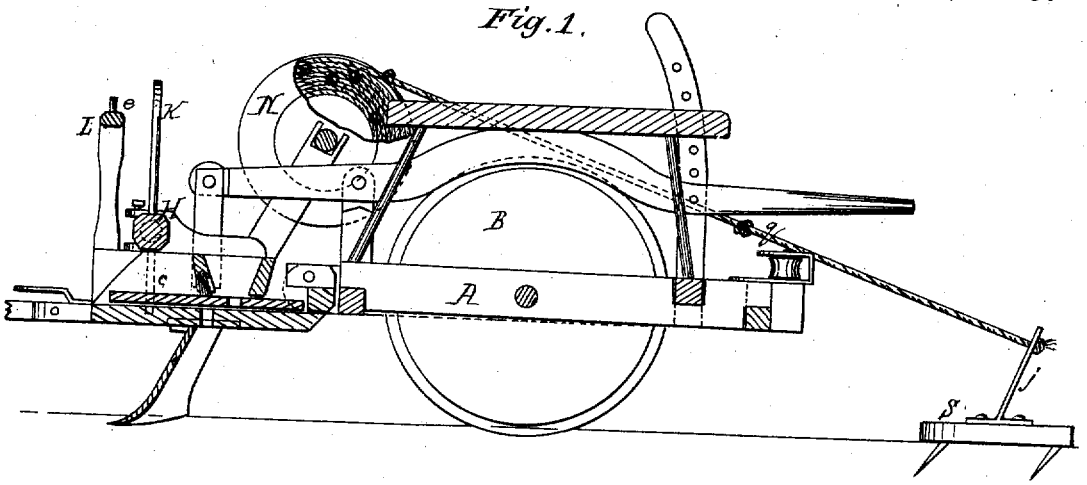
Figure 2:
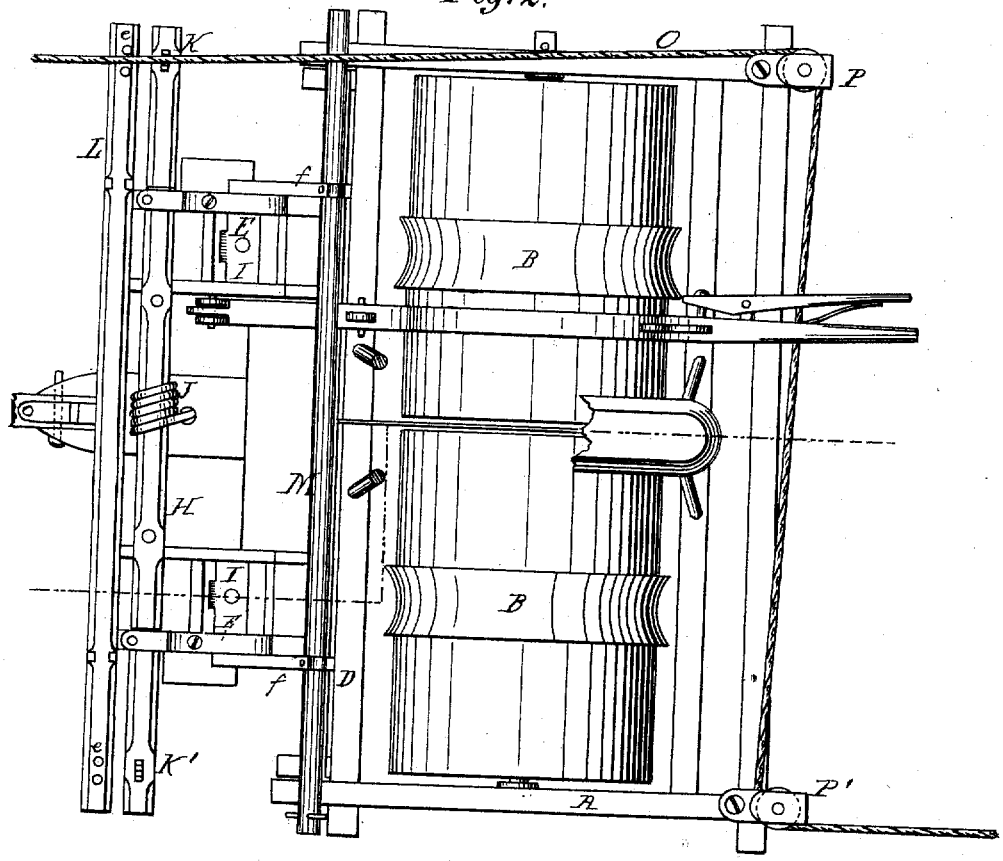

Figure 1 is a side sectional view of the invention, taken in the line *x x*, Fig. 2; and Fig. 2 is a plan or top view of the same.

Similar letters of reference denote corresponding parts in the two figures.

The invention consists, first, in the employment, in combination with a corn-planter, of a knotted cord, stretched from side to side across the field or piece of ground to be planted, and anchored or secured at its ends for actuating the seeding devices in the passage of the machine back and forth, and adapted by its flexible nature to be transferred or passed from one side of the machine to the other in the passage of the latter for laying the cord in the right line or position for the return or next movement or passage of the machine across the field. It further consists in the combination, with the planter, of suitable guiding devices or pulleys for transferring the cord or wire which actuates the seeding devices from one side of the machine to the other in the movement of the latter across the field, whereby the lateral movement of said cord or wire is effected on the machine instead of its being dragged laterally on the ground, thereby obviating all liability of its becoming caught upon or entangled with sticks, stones, or other obstructions.

To enable others skilled in the art to understand how the invention may be carried out in practice, the same will be described in detail with reference to the drawings, in which—

A represents the main frame of the machine, mounted upon suitable carrying wheels or rollers B B. At the front of the main frame is a transverse bar, D, with which the seed-hoppers E E are connected, arranged at the required distance apart for planting separate rows, and provided with seed-slides I, which, together with the other parts above named, and the devices for opening the furrow and for covering the seed, not forming directly any part of the invention, may be constructed and arranged in the same way as in machines now in use, and do not, therefore, require any special description, the invention relating to the means employed for actuating the seeding devices, and not to said seeding devices themselves. In front of the hoppers E E, in suitable bearing, is mounted a rocking bar, H, provided with arms or pendent levers C, connected with the seed-slides I I for actuating the same, and also with forked arms or upright levers K K′, through one or the other of which the knotted cord referred to passes as the machine is drawn forward, causing the knots to give a backward vibration or movement to the arms for rocking the bar H, and giving a reciprocating movement in one direction to the seed-slides. In advance of the forked arms or levers K, upon a transverse bar, L, guides or pins *e e* are placed for directing the cord to the forked arm or lever operated upon, the bar L being secured to uprights *d* at the proper height for that purpose. The rocking of the bar H, through the action of the cord on the arms or levers K, causes said arms to assume such an angle or inclination to the cord at the completion of the throw of the seeding-slides as will permit the knots to slip out of the fork therein. For moving the arms K and the seeding-slides connected therewith in a reverse direction, the rocking bar H has a spring, J, connected with it, the tension of which, when the arm K is released from a knot in the cord, serves to rock the bar H in the opposite direction, reversing the throw of the seed-slides, and also of the arm K, causing the latter to again assume the proper position to receive and be acted upon by the succeeding knot in the cord. M is a transverse rod or shaft, mounted upon suitable standards *f f*, its ends projecting beyond said standards, and adapted to receive a cord, reel, or spool, N, upon which the knotted cord is wound when not in use. O represents the knotted cord, and *q* the knots formed on it at suitable distances apart. Horizontal grooved pulleys P P′ are mounted upon the frame upon suitable fixed studs or pins, said pulleys being located opposite each other on the frame in proper relation to the forked arms or levers K K′, for giving direction to the cord passing through one or the other of said arms, according to the direction in which the machine is moving.

In the plan view, Fig. 2, the cord is represented as passing through the fork in the arm K, thence along the planted side of the machine outside of and to the rear of the pulley P, and from said pulley across the machine to the front and outside of pulley P′, and thence to the rear on a right line to the point of fastening. S represents what may be termed an anchor, provided with spikes on its under side to be driven into the ground, and having an upright forked bar, *j*, on its upper surface for receiving and holding the end of the cord. (See Fig. 1.)

The operation is as follows: The reel N, with the knotted cord O wound upon it, is placed on the rod or shaft M, and the machine drawn into the field to be planted, and the anchor S is driven into the earth at a furrow, fence, or any straight line, which may be termed a "head-line," at one side of the field. The cord O is then slipped into the forked bar *j* on the anchor, and is held by a knot, and the machine is drawn along the field at right angles to the head-line, the cord O being paid out as the machine advances, and when the opposite side of the field is reached the reel N is removed from the machine, another anchor, S, is secured in the ground, and the cord O is placed between the guides or pins *e e* at one end of the bar L, and in the fork of the rod K, directly behind the pins, and passes thence around the pulley P, which is in line with the rod K, thence transversely across the back of the frame A, around the pulley P′, and back to the forked bar *j* of the anchor last driven in the ground, the position of the cord O being shown in Fig. 2. The machine is then driven back to the point where the first anchor was secured in the ground, and the knots of the cord O, as the machine is drawn along, force back the rod K, and thereby turn the shaft H, the shaft being returned to its original position each time a knot passes the rod K by the spring J. A reciprocating motion is thereby given to the slides I, and two rows of seed are dropped at each passage of the machine across the field. When the place where the first anchor was driven in the ground is reached the cord is removed from the machine, the latter turned around, the first anchor taken up and placed in the ground the distance of four rows from where it was first secured, the cord placed on the machine as before, except that it now passes through the arm K′, and its relation to the pulleys is reversed, as explained, and the machine is then drawn back to the opposite side of the field, where the second anchor was driven in the ground, operated upon by the cord as before. The operation thus described is repeated until the whole field is planted.

The cord O, it will be seen, is received or taken up at the planted side of the machine, and in its passage over the machine, or, more correctly speaking, in the passage of the machine under the cord, the latter passes around the guiding-pulleys, as explained, and is transferred to and laid down at the opposite side of the machine on a line parallel with its former position. The pliability of the cord adapts it to be thus turned and drawn across the machine, and to be again turned into line with the path of the machine and laid upon the ground in proper position to act upon the machine upon its next return passage, thereby obviating the necessity of its being dragged laterally over the surface of the ground, and consequently all danger of its being caught upon and obstructed in its action by obstacles in its path, while at the same time the elasticity of the cord adapts it to yield to slight irregularities in the path or movement of the machine, thus overcoming the difficulties incident to the use of a jointed rod.

Having now described the invention, what is claimed as new, and sought to be secured by Letters Patent, is—

1. The combination, with a corn-planter, of a knotted cord for actuating the seeding devices.

2. In combination with the cord or its equivalent actuating the seeding devices of a corn-planter, guides or pulleys arranged to transfer said cord from one side of the machine to the other in its passage over the same.

GEORGE D. HAWORTH.
JAMES W. HAWORTH.
LYSANDER L. HAWORTH.
MAHLON HAWORTH.

Witnesses:
DAVID BIGELOW,
D. F. LEWIS,
K. H. ROBEY.